(No Model.) 3 Sheets—Sheet 3.
H. F. W. HUEG.
MACHINE FOR DIVIDING DOUGH.
No. 560,718. Patented May 26, 1896.
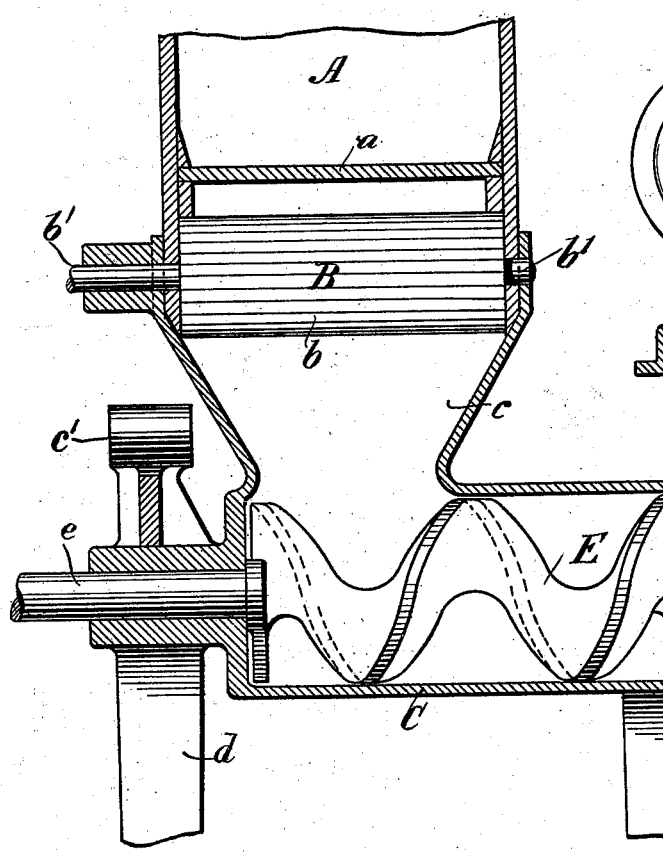
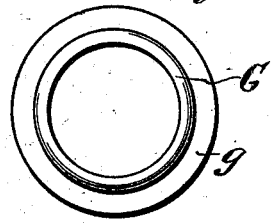
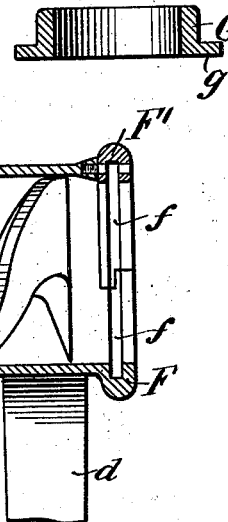
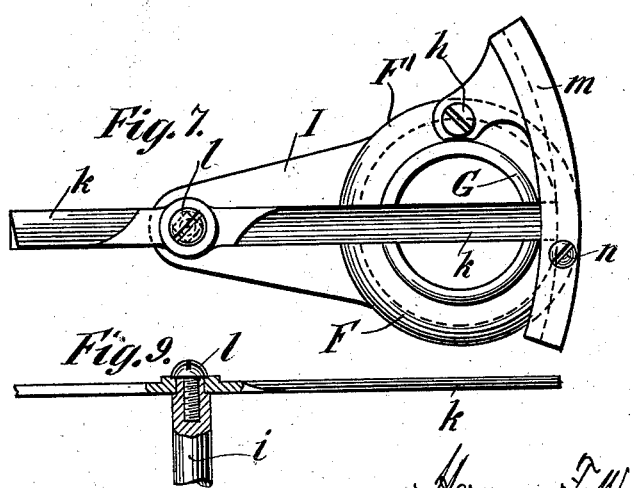
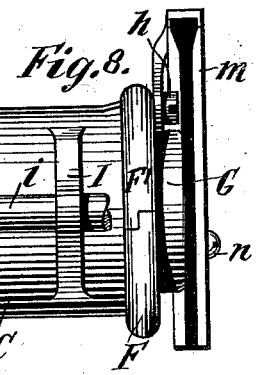
Witnesses
J. P. Nordstrom.
R. I. Elliott.
Herman F. W. Hueg Inventor
By his Attorney Henry Schreiter

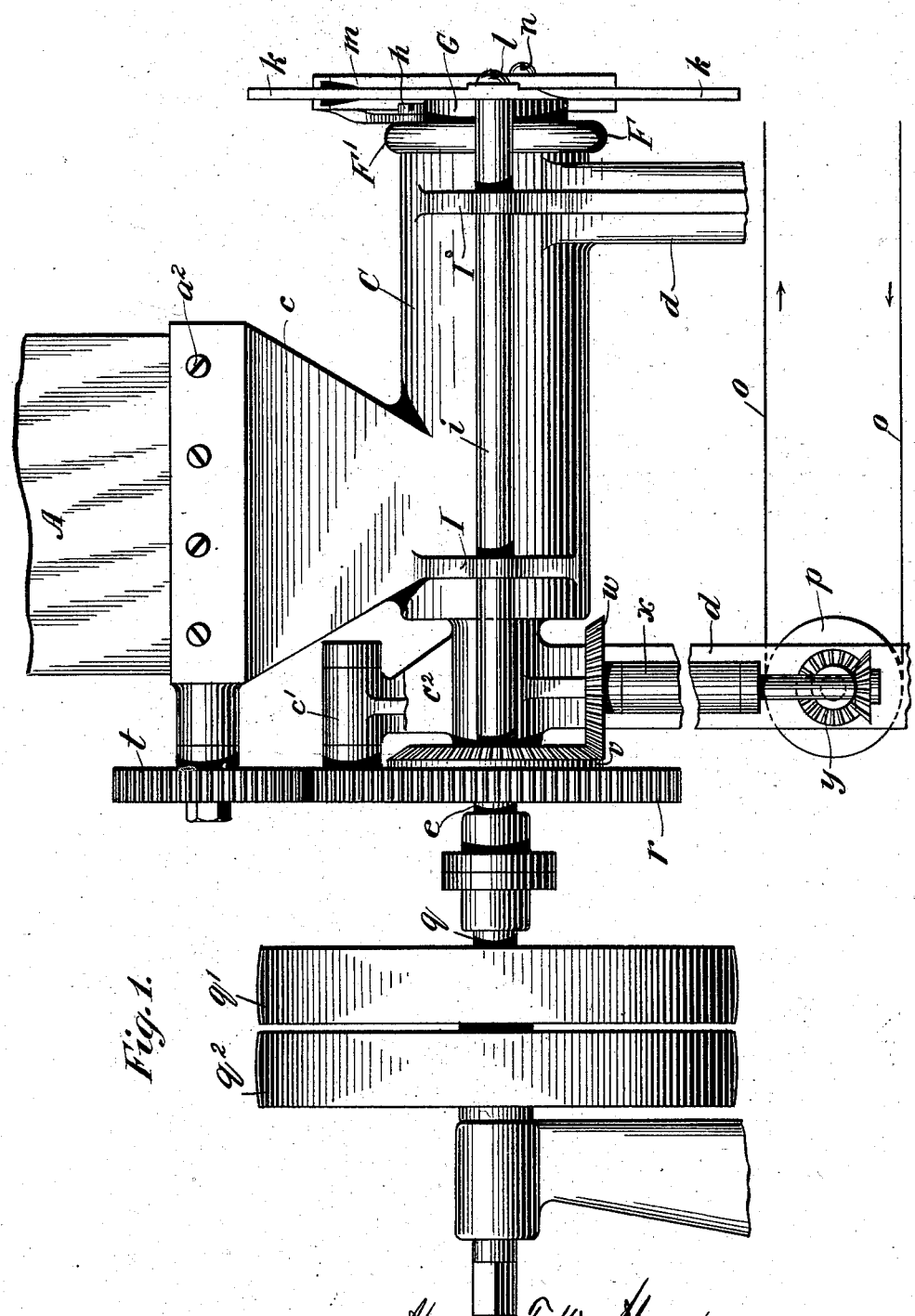

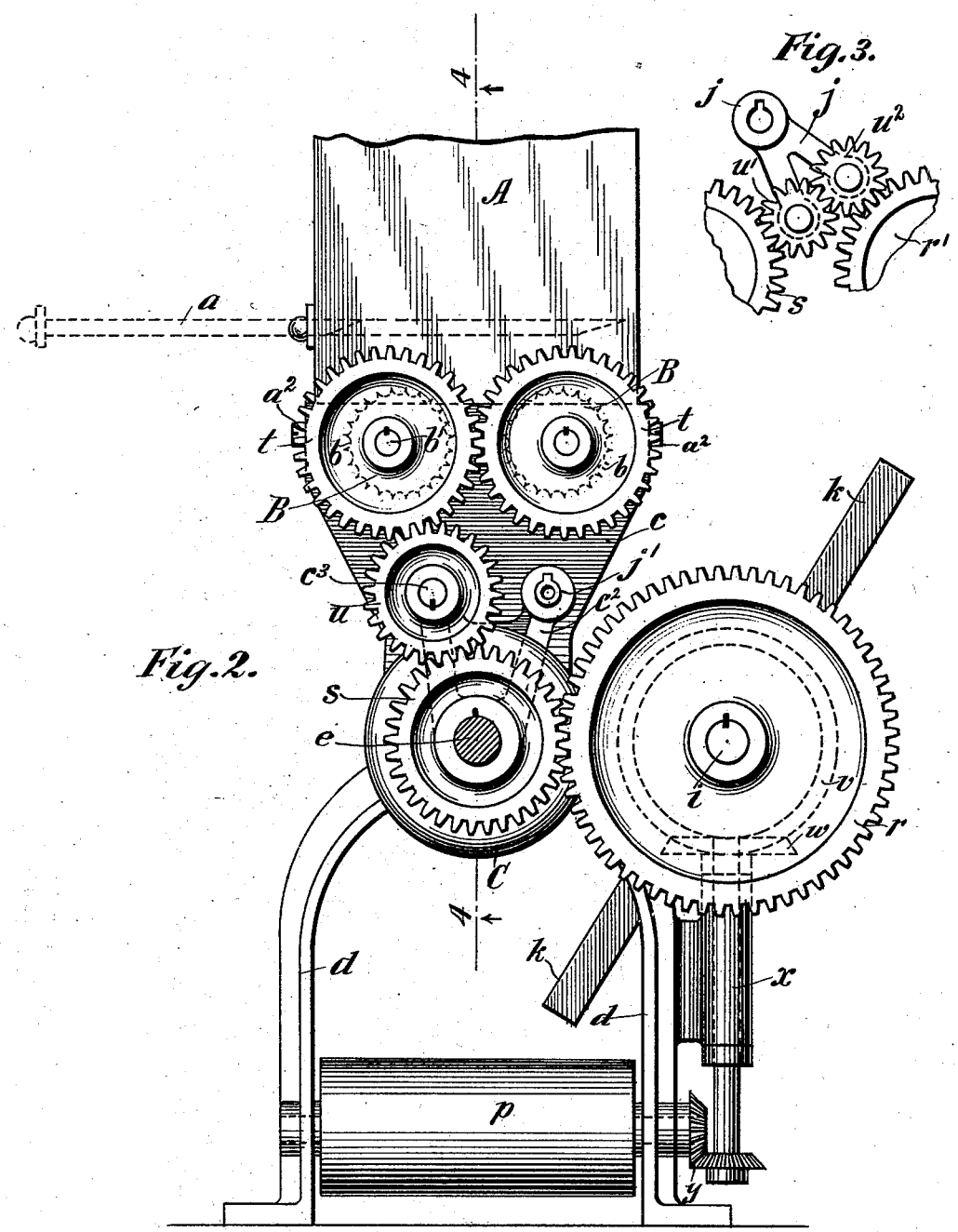

UNITED STATES PATENT OFFICE.

HERMAN F. W. HUEG, OF LONG ISLAND CITY, NEW YORK.

MACHINE FOR DIVIDING DOUGH.

SPECIFICATION forming part of Letters Patent No. 560,718, dated May 26, 1896.

Application filed December 9, 1895. Serial No. 571,553. (No model.)

*To all whom it may concern:*

Be it known that I, HERMAN F. W. HUEG, a citizen of the United States, residing in Long Island City, in the county of Queens and State of New York, have invented certain new and useful Improvements in Machines for Dividing Dough, of which the following is a specification.

My invention relates to devices for dividing dough and for cutting it into pieces of uniform size; and it consists of the hereinafter-described machine forcing the dough through an adjustable aperture and cutting it by a rotating cutter into pieces of uniform weight and size.

In the accompanying drawings, Figure 1 is a side elevation of my improved dough-dividing machine. Fig. 2 is an end elevation thereof. Fig. 3 is an elevation of the disconnected part of the exchangeable gears. Fig. 4 is a section on the line 4 4 indicated in Fig. 2. Fig. 5 is a plan view of the exchangeable discharge-aperture. Fig. 6 is a section thereof. Fig. 7 is an elevation of the front end of the machine, showing the cutter and its guide. Fig. 8 is a side elevation thereof, the cutter having been removed. Fig. 9 is a plan of the cutter, part being in section to show the means for connecting it to its shaft.

Similar letters of reference indicate corresponding parts in all the views.

Weighing of dough has been long since abandoned in large bakeries, and dividing it into pieces of uniform size has been substituted for the cumbersome weighing of each piece. This method requires that the dough be delivered under a constant pressure, and the dividing device actuated exactly in accordance with the mechanism moving the dough. To attain this purpose I have constructed my improved dough-dividing machine, consisting of hopper A, wherein the dough is filled and wherein two eccentrically-pivoted feed-rollers B, having longitudinal grooves $b$, rotate in opposite directions, being driven by the gears on the outside of the hopper. These rollers B feed the dough into the horizontal cylinder C, wherein the spiral plane E rotates and conveys the dough toward the open end of the cylinder and presses it through the aperture. The streak of dough passing out is then cut off by rotary cutter $k$, and thus divided into pieces of uniform size and weight. For changing the size and weight of the pieces the area of this aperture can be varied by exchanging the ring G and also the velocity of the cutter by changing the driving-gear, or the number of blades may be increased or reduced. The machine may be thus adjusted to divide the dough into pieces of almost any size and with greatest accuracy. Funnel $c$ and horizontal cylinder C are cast of iron in one piece. Hopper A is made preferably of wood and secured to the funnel $c$ by bolts $a^2$. Legs $d$, cast in one piece with cylinder C, support the whole machine and provide also supports for bearings of roller $p$ and the gear driving the endless apron $o$ stretched over this roller and conveying the divided pieces of dough to the bench. Sliding bottom $a$, provided near the lower end of the hopper just above the feeding-cylinders B, is used to cut off the supply of dough when the machine is to be stopped for change in work or for incidental repairs in the progress of the work. Feed-rollers B turn on trunnions $b$ in bearings provided near the top of the funnel $c$, and are actuated by the gears $t$ set on the outside of the machine. They are mounted eccentrically and provided with longitudinal grooves $b$ to grip and move the dough from hopper A into the horizontal cylinder C.

The rollers B, feeding the dough from the hooper A into the cylinder C, are mounted eccentrically and they rotate concurrently, approaching each other and receding at every turn. This I have found to be most effective contrivance for sufficient and steady feeding of the dough from the hopper into the cylinder after experiments made with centrally-revolving feed-rollers and other feeding devices. Centrically-mounted rollers must be brought comparatively close together in order to make them draw the dough, and then only an insufficient quantity of it is fed between them. If again they are set farther apart, their action on the dough is almost imperceptible. Eccentrically-mounted rollers, however, grip a quantity of the dough between them, feeding it steadily and forcibly downward at every turn. In this manner a dead motion of the spiral plane E is prevented and a uniform pressure maintained on the dough in forcing it through the shaping device.

Spiral plane E, rigidly secured to the shaft $e$, and receiving its motion from the belt-pulley $q'$, is shorter than cylinder C, leaving a free space at the open end of the cylinder, and it is also slightly smaller in diameter, to provide a small clearance between the edges of the spiral plane and the inner walls of the cylinder.

The lower half of the open end of the cylinder C is provided with a boss F, having a groove $f$ to receive and hold the flanges $g$ of the shaping-ring G. This boss is divided into halves, the upper and detachable half F' being fitted into a rabbet-joint with the lower half F and secured to cylinder C by the screw $h$. In this manner the shaping-ring G, forming the aperture through which the dough is forced, is removably secured to the end of the cylinder C. Of these rings G as many may be provided as the variety of the work might require, each having a hole of different diameter. They all must be of the same external diameter and interchangeable.

Rotary cutter $k$, having one, two, or more blades, is secured to the squarely-shouldered end of the horizontal shaft $i$ by screw $l$. This shaft $i$ runs in bearings set on brackets I, parallel with cylinder C, and may be driven by exchangeable gearing at various speeds. Shaft $i$ is just long enough to make the blades of cutter $k$, fastened to its end, pass close to the outer projecting edge of ring G without touching it. The blades are guided as they pass over the ring by guide $m$, having a groove shaped on the arc of a circle described by the ends of the blades. The guide is fastened by a lug extending from its upper end over the center line of the cylinder C, and having a hole for the screw $h$, holding also the upper detachable half of boss F'. In addition to this guide $m$ is also held by screw $n$. Guide $m$ keeps the blades of the cutter from striking the ring G and from being pushed therefrom by the pressure of the dough.

Below the cylinder C is the endless apron $o$, on which the pieces of dough fall and are conveyed to the bench. The apron passes over and is moved by roller $p$, set in bearings supported in the legs $d$, and this roller is driven by gears from the cutter-shaft $i$, so the motion of the apron will always correspond with the speed of this shaft, and be changed when the gear driving the cutter-shaft $i$ is changed.

Stud $e$ of the spiral plane E is coupled to driving-shaft $q$, driven by a belt over the pulley $q'$. A loose pulley $q^2$, set alongside of the driving-pulley, is provided to enable the operator to stop the machine for making changes or repairs. Gear-wheels $t$, keyed to rollers B, are driven through idle-wheel $u$, rotating on stud $c^3$, pillowed in bracket $c'$, forming part of the machine-frame. Gear-wheels $t$ are so set that the rollers B will alternately open and close the space between them and thus grip and force the dough successively from hopper A into the cylinder C.

Cog-wheel $s$ is keyed on shaft $e$ and gears with wheel $r$ on shaft $i$. Thus the cutter set on the shaft $i$ is driven at a speed constantly proportionate to the speed of the spiral plane E. This arrangement produces the lowest relative speed of the cutter, and if a cutter with only one blade is employed, and the ring having the largest opening, the dough will be divided into largest pieces. By adding another blade (changing the cutter) the dough will be divided into pieces of one-half of that maximal size, with three blades in one-third, and with four, in one-fourth. When very small wares are to be produced, speed of the cutter-shaft $i$ is increased by exchanging wheel $r$ for a smaller wheel $r'$. Then arm $j$, carrying two idle-wheels $u'$ and $u^2$, is set on stud $j'$, pillowed in the head of bracket $c^2$, cast on the cylinder C. Idle-wheels $u'$ and $u^2$ gear together. $u'$ is driven by wheel $s$, and $u^2$ drives wheel $r$. The size of the pieces may also be varied by changing the ring G, and it will be understood from this description that the dividing-machine may be adjusted to an almost unlimited variety of sizes, and that each size will be produced with utmost accuracy, as the speed of the cutter cannot possibly vary in its proportion to the speed of the spiral plane E, driving the dough through the aperture.

I claim upon this specification and desire to secure by Letters Patent—

1. A dough-dividing machine, consisting of a horizontal cylinder, closed at one end and having on the other end means for removably securing thereto rings with varying apertures, a funnel with two eccentrically-rotating feed-rollers, set upon and communicating with the horizontal cylinder; a spiral plane rotating in the said horizontal cylinder and pushing dough, fed in by the eccentric-rollers, through the aperture of the ring secured on the open end of the cylinder, an exchangeable rotary cutter, and gear for driving the feed-rollers, the spiral plane and the cutter from the main shaft.

2. In a dough-dividing machine, comprising a horizontal cylinder and a spiral plane rotating therein, the combination with a cylinder having a semicircular grooved boss, cast on the outlet end thereof, of a semicircular removable piece correspondingly grooved, adapted to be joined to the boss a screw passing through the semicircular removable piece and securing it to the cylinder, this piece forming with the boss a closed grooved flange around the outlet end of the horizontal cylinder, as a means for securing to the cylinder of exchangeable shaping-rings, for the purpose of varying the size of the aperture of the cylinder.

3. In a dough-dividing machine, the combination with a horizontal cylinder and a spiral plane, rotating therein of eccentrically-mounted feed-rollers geared thereto, whereby dough is fed to said plane and pushed thereby to the end of said cylinder.

4. In a dough-dividing machine, the combination with a rotary cutter, consisting of one or more blades rotating past the aperture of said machine, thereby cutting the dough passing from said aperture, into pieces of uniform length, of the guide secured to said machine and provided with a groove in which the ends of said blades engage, thereby guiding them past said aperture.

In witness that I claim the improvements described in the foregoing specification I have signed my name in the presence of two subscribing witnesses.

HERMAN F. W. HUEG.

Witnesses:
RICHARD I. ELLIOTT,
JOHN P. NORDSTROM.